Dec. 16, 1969  G. M. BROOKS  3,484,733
CONSTANT PRESSURE PROBE FOR NON-LINEAR POTENTIOMETERS
Filed Jan. 10, 1968  2 Sheets-Sheet 1

INVENTOR.
GEORGE M. BROOKS
BY
Hopgood & Calimafde
ATTORNEYS

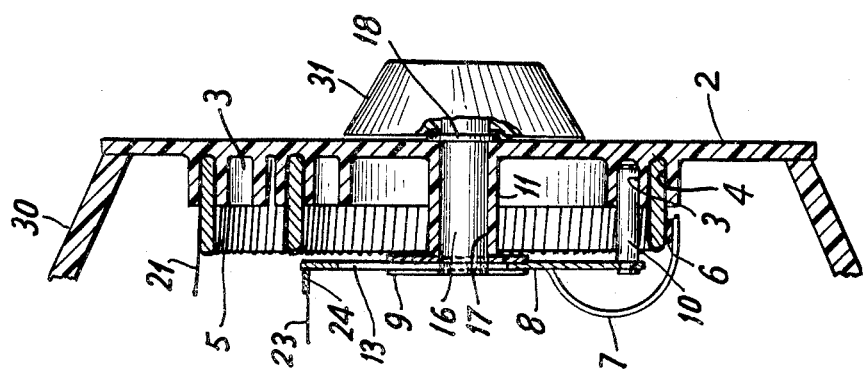
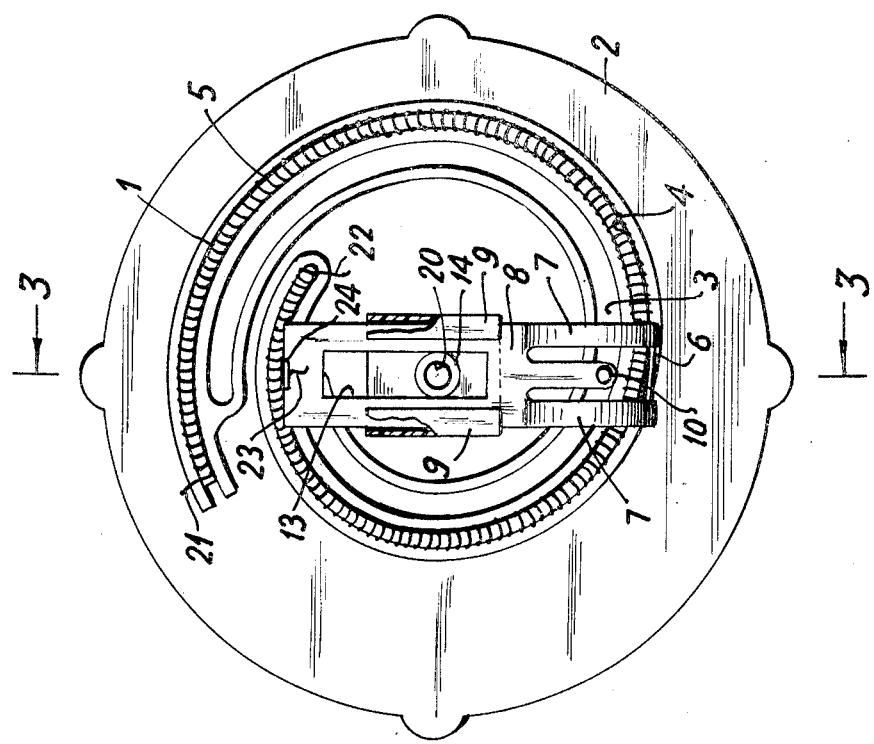

United States Patent Office 3,484,733
Patented Dec. 16, 1969

3,484,733
CONSTANT PRESSURE PROBE FOR NON-LINEAR POTENTIOMETERS
George M. Brooks, Sherburne, N.Y., assignor, by mesne assignments, to Jerrold Electronics Corporation, Philadelphia, Pa., a corporation of Delaware
Filed Jan. 10, 1968, Ser. No. 696,887
Int. Cl. H01c 5/02, 5/00
U.S. Cl. 338—168
7 Claims

ABSTRACT OF THE DISCLOSURE

A device for maintaining constant pressure between a curvilinear potentiometer coil and its probe contact. The probe contact is maintained a constant distance from the coil by the interaction of a cam channel parallel to the coil and a pin which is attached to the contact. The contact is rotatably and slidably mounted at the center of the spiral so that it may follow the coil in response to rotational motion.

BACKGROUND

The invention falls in the area of variable impedance devices and relates specifically to those devices which employ a spiral-shaped, helically wound coil. The spiral coil is used instead of a linear coil in order to conserve space, and allow for full 360° rotation.

In a typical spiral potentiometer, a wiping contact moves along a coil and is attached to a rotating arm so that as the arm is rotated, the contact will move in and out along the spiral. In most prior art installations, the wiping contact was connected to its supporting arm by a spring. The spring compensated for the change in radial distance of the contact from the center of rotation of the arm by expanding and contacting as the probe was moved in and out along the spiral coil. As the contact advanced outwardly along the spiral coil, more tension was placed upon the spring creating greater pressure by the probe upon the coil. This increase in pressure at the outer reaches of the spiral coil resulted in excessive wear.

It is an objection of this invention to eliminate the aforesaid increase in pressure associated with a spiral potentiometer, and to thereby overcome the disadvantages of increased wear and coil breakdown associated therewith.

SUMMARY

Briefly, the device provides a rotating and extending arm which supports the moving contact of the potentiometer. A guide pin attached to the arm rides in a cam channel parallel to the coil. The action of the guide pin and the cam channel keep the contact arm a preselected distance from the coil. The contact is attached to the arm by a spring which urges it into contact with the coil. As the distance between the coil and the contact arm does not vary, the pressure of the contact on the coil is constant.

The primary advantages of the invention are the reduction of wear on the coil, particularly in its outer reaches, and improved contact upon the inner portions of the coil.

Another advantage of the invention is the increased ease and smoothness of operation of a potentiometer employing it. As the probe contact slides as easily over the inner portions, the torque required to move the probe remains substantially constant.

Other objectives, advantages, and various further features of novelty and invention will be pointed out or will occur to those skilled in the art from a reading of the following specification in conjunction with the accompanying drawings.

BRIEF DESCRIPTION OF THE DRAWINGS

FIGURE 2 is a plan view of the potentiometer of FIGURE 1,
FIGURE 3 is a cross-sectional view taken along line 3—3 of FIGURE 2 and illustrating features of one embodiment of the invention.

DETAILED DESCRIPTION OF PREFERRED EMBODIMENT

Figure 1:
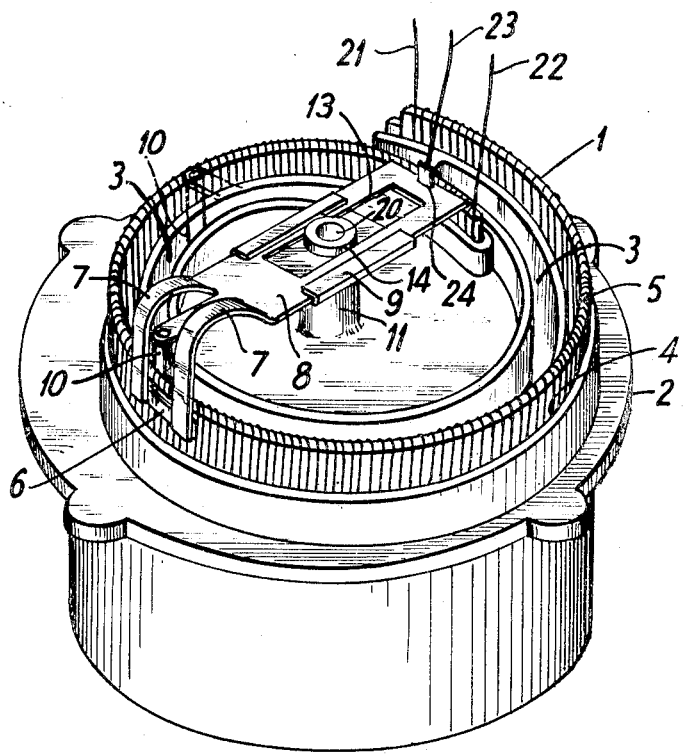
FIGURE 1 is a perspective view of a potentiometer embodying the features of the invention.

FIGURE 1 illustrates in perspective a variable potentiometer 1 embodying the invention. The base 2 of the potentiometer is constructed of a plastic insulating material, and is molded to form two parallel spiral channels 3 and 4.

The outer channel 4 is designed to retain the spiral coil 5 which may be glued into channel 4 or otherwise held in place by conventional means.

Probe contact 6 rides upon coil 5 and is held against coil 5 by the action of spring 7. Spring 7 is attached to the outside end of contact support arm 8, which is slidably attached to slide 9. Slide 9 is in turn rotatably mounted to center post 11 of base 2.

Guide pin 10 extends downwardly from the outside end of arm 8 and into inside channel 3. Arm 8 is substantially rigid in the vertical plane so that once the potentiometer is assembled, pin 10 is prevented from rising out of channel 3.

Slide 9, FIGURES 2 and 3, is a substantially flat and rectangular plate of insulating material elongated along the axis of arm 8. The side edges of slide 9 fold loosely over contact arm 8 and confine its sliding motion to along its longitudinal axis.

Arm 8 has a longitudinal recess 13 through which a guide-stop 14 projects. Guide stop 14 projects from slide 9 and functions to (a) prevent arm 8 from sliding out of slide 9, and (b) to aid in keeping arm 8 properly aligned within slide 9.

Slide 9 is rotatably mounted to base 2 at substantially the center point of spiral channels 3 and 4. A shaft 16 extends cooperatively through a bore 17 in center post 11 and is prevented from withdrawing therefrom by spring clip 18. One end of shaft 16 is attached to slide 9 and the other to means for varying the position of contact 6 with respect to coil 5. With shaft 16 so mounted, slide 9 is free to rotate with respect to center post 11. A knob 31 may be attached to shaft 16 to provide means for manually adjusting the potentiometer.

Lead wires 21 and 22 connect coil 5 to the potentiometer's associated circuitry, while contact 6 is connected to the circuitry by lead 23. Arm 8 and spring 7 are made of electrically conducting material, so that lead 23 may be connected to tab 24 at the inside end of arm 8.

A bore 20 may be provided through guide-stop 14 and shaft 16 for the passage lead wires 21, 22 and 23 when the potentiometer is remotely situated. This configuration is particularly advantageous when the potentiometer is utilized by the rotation of the base 2 and coil about the probe assembly rather than the reverse.

In operation, the value of the impedance presented by the potentiometer is varied by changing the position of probe contact 6 upon the coil 5. This is accomplished by rotating shaft 16, which in turn rotates slide 9 and arm 8. As arm 8 is rotated, guide pin 10 advances or retards in spiral channel 3. As guide pin 10 moves along channel 3, it carries arm 8 in and out through slide 9 and keeps the outer end of arm 8 equidistant from coil 5. Spring 7 being attached to the outer end of arm 8 urges probe contact 6 against coil 5 with a constant preselected pressure.

FIGURE 3 is a partial cut-away view of a manually operated potentiometer. In the configuration illustrated, the coil base 2 becomes the top of a housing 30 which encloses coil 5. Shaft 16 extends upwardly from slide 9 and is attached at the opposite end to knob 31 which provides means by which arm 8 may be rotated to position contact 6 upon coil 5. Electrical leads 21, 22 and 23 may be connected into the circuit utilizing the coil in any conventional manner.

I claim:

1. A potentiometer having a helical coil in spiral configuration, a rotating contact support means, a wiping contact and spring means to urge said wiping contact into electrical contact with said coil, wherein the improvement comprises;
   a spiral cam channel parallel to said coil,
   a contact support arm slidably mounted to said rotating contact support means,
   a cam channel follower attached to said slidably mounted support arm and riding in said cam channel,
   and wherein said spring means to urge said wiping contact into electrical contact with said coil is connected to said slidably mounted support arm.

2. A device for maintaining constant pressure between a potentiometer coil and a wiping contact therefore comprising;
   a base,
   a coil attached to said base,
   a cam channel parallel to said coil,
   a contact arm, pivotally and slidably attached to said base,
   a guide pin attached to said arm and riding in said cam channel,
   a wiping electrical contact attached to said arm and in contact with said coil,
   means to move said arm so that said contact will move upon said coil and said guide pin along said cam channel,
   and spring means connecting said contact to said arm to urge said contact against said coil,
   whereby as said contact is moved to vary said potentiometer, said arm is held close to said coil by said guide pin so that the pressure upon the coil by said electrical contact is substantially constant.

3. The device of claim 2 wherein said coil is non-linear.

4. The device of claim 2, wherein said coil is spiral in shape and said contact arm is mounted at substantially the geometric center of the spiral, so that as the contact arm is pivoted, the guide pin will advance said arm and the contact along said spiral coil.

5. The device of claim 2, wherein said spring means comprises the outer end of said contact arm.

6. The device of claim 2 wherein said base is a molded insulator, comprised of,
   an integral coil retaining channel and
   an integral cam channel parallel thereto.

7. A potentiometer comprised of;
   a base of molded plastic insulating material including a first spiral channel for a helical impedance coil and a spiral cam channel parallel thereto,
   a helical impedance coil disposed within said first spiral channel,
   a contact support arm rotatably mounted to said base at the center of said helical coil,
   contact means in frictional contact with said coil and slidably attached to said support arm to vary the impedance of the potentiometer by changing position on said coil, said contact means having a guide pin extending therefrom and engaging said spiral cam channel,
   and spring means integral said contact means to urge said contact means into contact with said coil.

References Cited

UNITED STATES PATENTS

| | | | |
|---|---|---|---|
| 2,712,584 | 7/1955 | Pantages | 338—147 X |
| 2,745,915 | 5/1956 | Pantages | 338—147 X |
| 2,888,653 | 5/1959 | Laffe | 338—147 X |
| 1,785,779 | 12/1930 | Lauter | 338—170 X |

LEWIS H. MYERS, Primary Examiner

A. T. GRIMLEY, Assistant Examiner

U.S. Cl. X.R.

338—141, 147, 170